(12) United States Patent
Tabata

(10) Patent No.: US 8,998,724 B2
(45) Date of Patent: Apr. 7, 2015

(54) COMMUNICATION GAME SYSTEM, COMMUNICATION GAME APPARATUS, AND PROGRAM

(75) Inventor: Hajime Tabata, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 95 days.

(21) Appl. No.: 13/548,636

(22) Filed: Jul. 13, 2012

(65) Prior Publication Data

US 2013/0053152 A1 Feb. 28, 2013

(30) Foreign Application Priority Data

Aug. 24, 2011 (JP) ................................ 2011-182790

(51) Int. Cl.
*A63F 9/00* (2006.01)
*A63F 13/30* (2014.01)

(52) U.S. Cl.
CPC ............ *A63F 13/12* (2013.01); *A63F 2300/556* (2013.01); *A63F 2300/5566* (2013.01); *A63F 2300/558* (2013.01); *A63F 2300/636* (2013.01)

(58) Field of Classification Search
CPC ............ A63F 2300/00; A63F 2300/10; A63F 2300/20; A63F 2300/30; A63F 2300/406; A63F 2300/407; A63F 2300/60
USPC .......................................................... 463/42
See application file for complete search history.

(56) References Cited

U.S. PATENT DOCUMENTS

| | | | |
|---|---|---|---|
| 6,755,743 B1 | 6/2004 | Yamashita et al. | |
| 6,932,708 B2 | 8/2005 | Yamashita et al. | |
| 7,792,902 B2 | 9/2010 | Chatani et al. | |
| 7,831,666 B2 | 11/2010 | Chatani et al. | |
| 8,075,404 B2 | 12/2011 | Stamper et al. | |
| 8,088,007 B2 | 1/2012 | Tabata | |
| 2003/0217135 A1 | 11/2003 | Chatani et al. | |
| 2004/0198497 A1 | 10/2004 | Yamashita et al. | |
| 2004/0198498 A1 | 10/2004 | Yamashita et al. | |

(Continued)

FOREIGN PATENT DOCUMENTS

| | | |
|---|---|---|
| JP | 2002-306851 | 10/2002 |
| JP | 2002-369968 | 12/2002 |

(Continued)

OTHER PUBLICATIONS

Counter Strike for PC Review by 9mmStudios Aug. 28, 2009. http://www.youtube.com/watch?v=sYdPTQgmxa8.*

(Continued)

*Primary Examiner* — Damon Pierce
*Assistant Examiner* — Jeffrey Wong
(74) *Attorney, Agent, or Firm* — Greenblum & Bernstein, P.L.C.

(57) ABSTRACT

A game system which enables a host player to progress a game in collaboration with guest players is provided. The host player progresses the game by moving a party, including a plurality of player characters, on a field. When the party arrives at a predetermined point on a predetermined field, a battle with an enemy character is started. When a player character of the party becomes inoperative in the battle, a player character of a guest player may be substituted for the inoperative player character by sending a support request to the guest player. Although there is a time limit that the player character of the guest player may participate in the battle, the time limit may be extended when the corresponding player character achieves a predetermined condition in the battle.

20 Claims, 6 Drawing Sheets

(56) References Cited

U.S. PATENT DOCUMENTS

| | | | |
|---|---|---|---|
| 2006/0173958 A1 | 8/2006 | Chatani et al. | |
| 2006/0190540 A1 | 8/2006 | Chatani et al. | |
| 2008/0004117 A1* | 1/2008 | Stamper et al. | 463/42 |
| 2010/0287239 A1 | 11/2010 | Chatani et al. | |
| 2011/0250957 A1 | 10/2011 | Suzuki et al. | |
| 2012/0196678 A1 | 8/2012 | Fujisawa et al. | |

FOREIGN PATENT DOCUMENTS

| | | |
|---|---|---|
| JP | 2005-520265 | 7/2005 |
| JP | 2010-042083 | 2/2010 |
| JP | 2010-092304 | 4/2010 |
| JP | 2010-167251 | 8/2010 |
| JP | 2011-092623 | 5/2011 |

OTHER PUBLICATIONS

Extended European Search Report in European Patent Application No. 12176027.6, dated Sep. 17, 2012.

Office Action from Japan Patent Office (JPO) Japanese Patent Application No. 2011-182790, dated Aug. 27, 2013, together with an English language translation thereof.

* cited by examiner

US 8,998,724 B2

COMMUNICATION GAME SYSTEM, COMMUNICATION GAME APPARATUS, AND PROGRAM

CROSS REFERENCE TO RELATED APPLICATION

The present disclosure relates to subject matter contained in Japanese Patent Application No. 2011-182790, field on Aug. 24, 2011, the disclosure of which is expressly incorporated herein by reference in its entirety.

BACKGROUND OF THE INVENTION

1. Field of the Invention

The present invention relates to a communication game system including a host terminal apparatus used by a host player, and a plurality of guest terminal apparatuses used by a plurality of guest players, respectively.

2. Description of the Related Art

In the past, there has been provided an online game that enables a plurality of players to play a game within the same virtual space by connecting a plurality of game apparatuses through a communication network. Also, a portable game apparatus has an ad-hoc communication function that transmits and receives information directly with other portable game apparatuses located at adjacent places, and thus, the use of the ad-hoc communication function enables a plurality of players to play a game within the same virtual space.

For example, in an online game system in which a plurality of game apparatuses are connected to a server apparatus on the Internet and a plurality of players can play a game within the same virtual space under the control of the server apparatus, players are matched in a lobby space opened in the server apparatus and the matched players play a game within the same virtual space (see, for example, JP 2010-167251 A and JP 2011-92623 A).

Also, in a system in which portable game apparatuses are connected to stationary game apparatuses and a plurality of players can play a game within the same virtual space, a lobby image for the plurality of players to exchange information is displayed on the portable game apparatuses to allow the players to enter a room, and the game is started when the number of participants in the room reaches a predetermined number or more (see, for example, JP 2010-92304 A).

However, since the methods disclosed in JP 2010-167251 A, JP 2011-92623 A and JP 2010-92304 A require for the players matched once or the players that have entered the same room to always play together until the game is ended, more players cannot play the game in cooperation with one another. Also, in an ad-hoc communication system in which a plurality of portable game apparatuses are directly connected to one another, persons other than colleagues already acquainted with one another cannot play together.

SUMMARY OF THE INVENTION

The invention is directed to provide a communication game system and the like which enables a host player to progress a game in cooperation with more guest players.

To achieve the above-subject matter, a communication game system according to the first aspect of the present invention is characterized in that the communication game system comprising a host terminal apparatus used by a host player; and at least one guest terminal apparatus used by at least one guest player, respectively, wherein the host terminal apparatus and the at least one guest terminal apparatus are communication-connected to allow the at least one guest player to participate in a game executed by the host player, the game is progressed by operating a plurality of host characters set as a character of the host player, including at least one character operating according to a guidance from the host player, by the operation of the host player, the host terminal apparatus includes a host guidance inputer that inputs the guidance of the host player for progressing the game, the at least one guest terminal apparatus each includes: a guest guidance inputer that inputs a guidance from the guest player for progressing the game by operating a guest character operating according to the guidance of the guest player, by the operation of the guest player using the corresponding guest terminal apparatus; and a game participater that allows the guest character to temporarily participate in the game by the host terminal apparatus, and the communication game system includes a game progresser that progresses the game by operating the plurality of host characters according to the guidance from the host guidance inputer, cause the guest character to participate by substituting the guest character for any one of the plurality of host characters, when a guest character is allowed to participate in the game by the game participator, and progress the game by operating the guest character according to the guidance from the guest guidance inputer.

In the communication game system, a host terminal apparatus and a plurality of guest terminal apparatuses are communication-connected to cause certain guest players to participate in a game executed by a host player (in particular, specific game). However, in this game, a plurality of host characters set as a character of the host player exist. The host players execute the game by operating the plurality of host characters. When a specific game is executed during the progress of the game, one or more of the plurality of host characters may be inoperative.

When one or more of a plurality of host characters are inoperative, or the like, the guest player can progress a specific game together with a host player by causing his or her own guest character to participate by substituting the guest character for any one of the plurality of host characters from the guest terminal apparatus. Instead of progressing the game by the previously determined players, the host player and the guest player perform a cooperative play at each specific game. Therefore, a cooperative play by more players can be easily realized.

Also, in the communication game system, the specific game may be a battle with a plurality of host characters and enemy characters (which are not guest characters). The plurality of host characters may be selected by the host player among more selectable characters. Also, when at least one of the plurality of host characters operates according to a guidance of the host player, the host character operating according to a guidance from the corresponding host player may include characters which follow the guidance but actually performs an operation determined by an AI routine. Provided that all host characters may also operate according to the guidance from the host player.

To achieve above-subject matter, a communication game system according to the first aspect of the present invention may comprise: a host mediation apparatus used by a host player; a host terminal apparatus that is communication-connectable to the host mediation apparatus and executes a game by the operation of the host player; a plurality of guest mediation apparatuses used by at least one guest player, respectively; and a guest terminal apparatus that is communication-connectable to the respective guest mediation apparatus and executes the game by the operation of the respective guest player, wherein the host terminal apparatus and the guest terminal apparatus are communication-connected through the host mediation apparatus and the at least one guest mediation apparatus to allow any one of the plurality of guest players to participate in the game executed by the host player, the game is progressed by operating a plurality of host characters set as a character of the host player, including at least one character operating according to a guidance from the host player, by the operation of the host player, the host terminal apparatus includes a host guidance inputer that inputs the guidance of the host player for progressing the game, the at least one guest terminal apparatus each includes: a guest guidance inputer that inputs a guidance of the guest player for progressing the game by operating a guest character operating according to the guidance from the guest player, by the operation of the guest player using the corresponding guest terminal apparatus; and a game participater that allows the guest character to temporarily participate in the game by the host terminal apparatus, and the communication game system includes a game progresser that progresses the game by operating the plurality of host characters according to the guidance from the host guidance inputer, cause the guest character to participate by substituting the guest character for any one of the plurality of host characters, when a guest character is allowed to participate in the game by the game participator, and progress the game by operating the guest character according to the guidance from the guest guidance inputer.

In the communication game system, the host terminal apparatus (portable video game apparatus) and the plurality of guest terminal apparatuses (portable video game apparatuses) are communication-connected through the host mediation apparatus (stationary video game apparatus) and the plurality of guest mediation apparatuses (stationary video game apparatuses), and any guest player participates in a game (in particular, specific game) executed by the host player. When one or more of a plurality of host characters are inoperative, or the like, the guest player can progress the specific game together with the host player by causing his or her own guest character to participate by substituting the guest character for any one of the plurality of host characters from the guest terminal apparatus.

As such, instead of progressing the game by the previously determined players, the host player and the guest player positioned at different locations perform a cooperative play at each specific game. Therefore, a cooperative play by more players can be easily realized.

In the communication game system, while the game is progressed, one or more of the plurality of host characters may be inoperative. The host terminal apparatus further includes a support requestor that requests a support by the guest character in the game, with respect to one or more of the plurality of guest terminal apparatuses, when any one of the plurality of host characters becomes inoperative while the game is progressed. When receiving the support request by the support requestor, the game participater may cause the guest character to participate in the game by substituting the guest character for the inoperative host character.

When any one of the plurality of host characters becomes inoperative in the specific game, it is disadvantageous for the host player to progress the specific game. In this case, by requesting the support to one or more of the plurality of guest terminal apparatuses and progressing the specific game by the participation of the guest character, the disadvantage due to the occurrence of the inoperative host character can be compensated. Also, by receiving the support request, the guest player can also cause his or her own guest character to easily participate in the specific game executed by the host player.

In the communication game system, the plurality of host characters may include an autonomous working character operating regardless of the guidance from the host guidance inputer. The host terminal apparatus may further include a participation mode setuper that sets to a guest participation mode which allows the guest player to participate by substituting the guest player for the autonomous working character in the game. When the guest participation mode is set in the host terminal apparatus, the game participater may cause the guest character to participate in the game by substituting the guest character for the autonomous working character.

Herein, although the host characters include the autonomous working character operating regardless of the guidance from the host player, if the host player performs a setting to the guest participation mode, the guest character can participate in the game by substituting the guest character for the autonomous working character, regardless of whether or not the autonomous working character is inoperative. Therefore, since the opportunity to allow the guest character to participate in the game executed by the host player, the cooperative play by more players can be more easily realized. On the other hand, since only the autonomous working character among the host characters can be replaced with the guest character, there is no case in which the host player himself or herself cannot be involved in the specific game.

In the communication game system, it is preferable that participation time allowing the guest character to participate in the game be variable according to an operation result of the guest character in the game after the participation in the game.

Herein, in the game, a task necessary for a guest character participating in the game to achieve at each time from a participation start, may be set. Participation time of the guest character may be extended whenever the task set at each time is achieved.

As such, by varying the participation time of the guest character according to the operation result of the guest character in the game, the guest character which is helpful to the host player can be allowed to participate in the game for a long time, and the guest character which is not helpful to the host player can be quickly ejected from the game. Therefore, each host player can progress the game with higher priority by the participation of the guest character.

To achieve the above-subject matter, a communication game apparatus according to the second aspect of the present invention is characterized in that the apparatus for allowing any one of at least one guest player to participate in a game executed by a host player by a communication connection with at least one guest terminal apparatus used by the at least one guest player, wherein the game is progressed by operating a plurality of host characters set as a character of the host player, including at least one character operating according to a guidance from the host player, by the operation of the host player, the communication game apparatus comprises: a game progresser that progresses the game by operating the plurality of host characters according to the guidance from the host player; and a game participater that receives a temporary participation of a guest character operating according to a guidance from a guest player in the game executed by the game progresser, and when a guest character is allowed to participate in the game by the game participater, the game progresser receives a participation of the guest character by substituting the guest character for any one of the plurality of host characters, and progresses the game by operating the guest character according to a guidance from the guest terminal apparatus.

To achieve the above-subject matter, a communication game apparatus according to the second aspect of the present invention may be characterized in that the apparatus for allowing any one of at least one guest player to participate in a game executed by a host player by communication-connecting to a guest terminal apparatus executing the game by the operation of each guest player, the guest terminal apparatus being communication-connectable to each guest mediation apparatus through a communication connection between at least one guest mediation apparatus used by at least one guest player and a host mediation apparatus used by a host player, wherein the game is progressed by operating a plurality of host characters set as a character of the host player, including at least one character operating according to a guidance from the host player, by the operation of the host player, the communication game apparatus comprises: a game progresser that progresses the game by operating the plurality of host characters according to the guidance from the host player; and a game participater that receives a temporary participation of a guest character operating according to a guidance from a guest player in the game progressed by the game progresser, and when a guest character is allowed to participate in the game by the game participater, the game progresser receives a participation of the guest character by substituting the guest character for any one of the plurality of host characters, and progresses the game by operating the guest character according to a guidance from the guest terminal apparatus.

To achieve the above-subject matter, a program according to the third aspect of the present invention is characterized in that the program for executing a communication game allowing any one of at least one guest player to participate in a game executed by a host player by a communication connection with at least one guest terminal apparatus used by at least one guest player, wherein the game is progressed by operating a plurality of host characters set as a character of the host player, including at least one character operating according to a guidance from the host player, by the operation of the host player, the program causes a computer apparatus to function as: a game progresser that progresses the game by operating the plurality of host characters according to the guidance from the host player, and a game participater that receives a temporary participation of a guest character operating according to a guidance from a guest player in the game executed by the game progresser, and when a guest character is allowed to participate in the game by the game participater, the game progresser receives a participation of the guest character by substituting the guest character for any one of the plurality of host characters, and progresses the game by operating the guest character according to a guidance from the guest terminal apparatus.

To achieve above-subject matter, a program according to the third aspect of the present invention may be characterized in that the program for executing a communication game allowing any one of at least one guest player to participate in a game executed by a host player by communication-connecting to a guest terminal apparatus executing the game by the operation of each guest player, the guest terminal apparatus being communication-connectable to each guest mediation apparatus through a communication connection between at least one guest mediation apparatus used by at least one guest player and a host mediation apparatus used by a host player, wherein the game is progressed by operating a plurality of host characters set as a character of the host player, including at least one character operating according to a guidance from the host player, by the operation of the host player, the program causes a computer apparatus to function as: a game progresser that progresses the game by operating the plurality of host characters according to the guidance from the host player, and a game participater that receives a temporary participation of a guest character operating according to a guidance from a guest player in the game progressed by the game progresser, and when a guest character is allowed to participate in the game by the game participater, the game progresser receives a participation of the guest character by substituting the guest character for any one of the plurality of host characters, and progresses the game by operating the guest character according to a guidance from the guest terminal apparatus.

The program according to the third aspect can be provided by being recorded on a computer-readable recording medium. The computer-readable recording medium may be a recording medium which is detachably configured in the computer apparatus and provided separately from the computer apparatus. The computer-readable recording medium may be a recording medium, such as a fixed disk device, which is provided within the computer apparatus and provided together with the computer apparatus. The program according to the third aspect may be transferred from the server apparatus existing on the network to the computer apparatus through the network by overlapping the data signals with carrier waves.

Also, as a single body, each of the host terminal apparatus and the guest terminal apparatus constituting the communication game system according to the first aspect also falls within the scope of the invention. In the communication game system to which a plurality of terminal apparatuses are communication-connected, the host terminal apparatus and the guest terminal apparatus are not fixed, and the terminal apparatus functioning as the host terminal apparatus in one scene can function as the guest terminal apparatus in another scene.

DETAILED DESCRIPTION OF EMBODIMENTS

Hereinafter, embodiments of the invention will be described with reference to the drawings.

Figure 1:
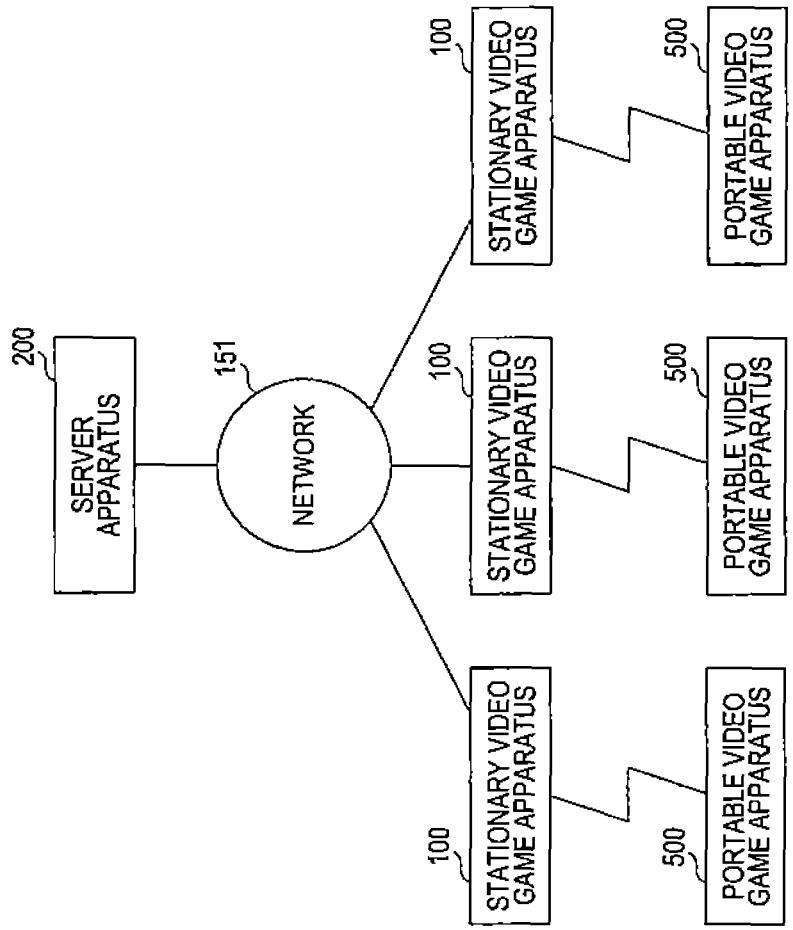
FIG. 1 is a diagram illustrating a configuration of a communication game system according to an embodiment of the invention.

FIG. 1 is a block diagram illustrating a configuration of a communication game system according to the embodiment. As illustrated, the communication game system includes a plurality of stationary video game apparatuses 100 (herein, only three apparatuses are illustrated), portable video game apparatuses 500, and a server apparatus 200. The respective stationary video game apparatuses 100 are connected to the server apparatus 200 through a network 151. Also, the portable video game apparatuses 500 can be communication-connected to the stationary video game apparatuses 100 by wireless. One stationary video game apparatus 100 and one portable video game apparatus 500 are provided to form a pair.

In a game applied to the communication game system, the respective players using the portable video game apparatuses 500 progress the game while moving their own player characters on a field formed in a virtual space (game space) common to all players. The player characters include working characters which operate according to a guidance input by the respective players, and artificial intelligence (AI) characters which operate while following the operations of the working characters and of which detailed operations are determined by AI routines.

The game in the communication game system, basically, is performed while the respective players independently move their own player characters on the field and execute battle with enemy characters encountered anywhere on the field. Instead of the player characters (working characters or AI characters) having no battle ability in the battle, or instead of the AI characters regardless of whether or not the characters have no battle ability by the setting of the players, player characters (working characters) of other players, however, can participate in the corresponding battle.

The respective characters having executed the battle can obtain experience points in the battle by defeating enemy characters. Accordingly, the players can reinforce their own player characters and defeat more powerful enemy characters. Characters having participated in battle executed by other players can also obtain experience points according to the result of the corresponding battle. Also, details of the game in the communication game system will be described later.

Figure 2:
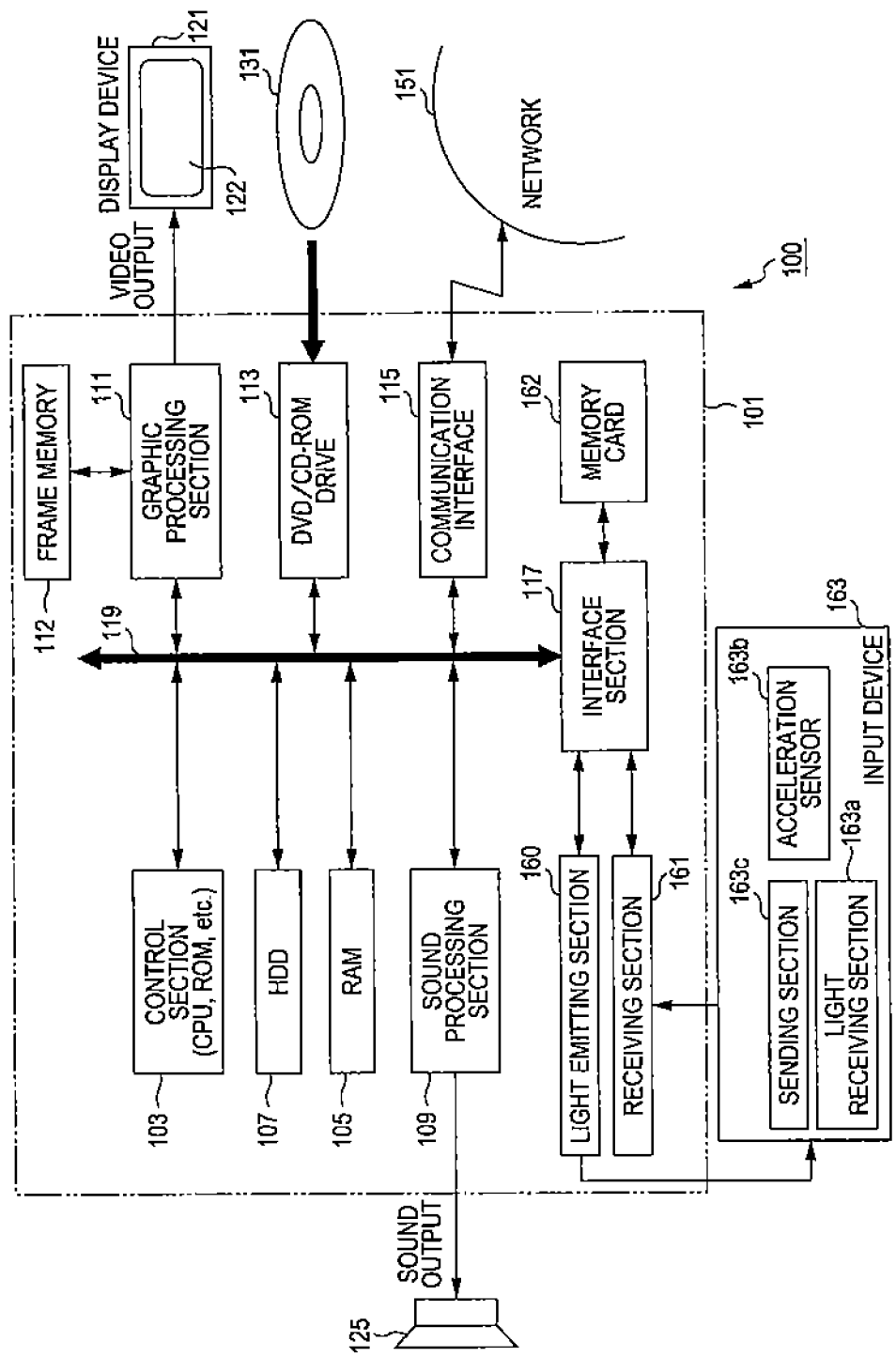
FIG. 2 is a block diagram illustrating a configuration of a stationary video game apparatus of FIG. 1.

FIG. 2 is a block diagram illustrating a configuration of the stationary video game apparatus 100 of FIG. 1. As illustrated, the stationary video game apparatus 100 is established centering on an apparatus body 101. The apparatus body 101 includes a control section 103, a random access memory (RAM) 105, a hard disk drive (HDD) 107, a sound processing section 109, a graphic processing section 111, a DVD/CD-ROM drive 113, a communication interface 115, and an interface section 117, which are connected to an internal bus 119.

The sound processing section 109 of the apparatus body 101 is connected to a sound output device 125, which is a speaker, and the graphic processing section 111 is connected to a display device 121 having a display screen 122. The DVD/CD-ROM drive 113 can be mounted with a recording medium (in this embodiment, DVD-ROM or CD-ROM) 131. The communication interface 115 is connected to the network 151. A light emitting section 160, a receiving section 161, and a memory card 162 are connected to the interface section 117.

The control section 103 includes a central processing unit (CPU), a read only memory (ROM), and the like, and executes a program stored in the HDD 107 or the recording medium 131 to perform a control of the apparatus body 101. The control section 103 includes an internal timer that counts current time. The RAM 105 is a work area of the control section 103. The HDD 107 is a storage area for storing a program or data. When the program executed by the control section 103 issues a guidance to perform a sound output, the sound processing section 109 interprets the guidance and outputs a sound signal to the sound output device 125.

According to a rendering command output from the control section 103, the graphic processing section 111 deploys an image on a frame memory (frame buffer) 112 (in the drawing, although illustrated in the outside of the graphic processing section 111, the frame memory 112 is provided inside a RAM included in a chip constituting the graphic processing section 111), and outputs a video signal for displaying an image on the display screen 122 of the display device 121. A 1-frame time of the image included in the video signal output from the graphic processing section 111 is, for example, 1/30 second.

The DVD/CD-ROM drive 113 reads the program and data from the recording medium 131. The communication interface 115 is connected to the network 151 and performs a communication with other computers.

An input device 163 includes a light receiving section 163a, an acceleration sensor 163b, and a sending section 163c. The light receiving section 163a receives light illuminated from each LED included in the light emitting section 160. A difference in the number and position of LEDs enabling the light receiving section 163a to receive light are caused by a direction of the input device 163. The acceleration sensor 163b is provided with a triaxial or more multiaxial acceleration sensor, and detects a slope and three-dimensional motion of the input device 163. The input device 163 also includes a direction key and a plurality of operation buttons. By the manipulation of the operation buttons or the direction key included in the input device 163 of the stationary video game apparatus 100, or by the slope and three-dimensional motion of the input device 163, an operation guidance, such as an entrance into a lobby, an entrance into a room, a creation of a room, or the like is given.

The sending section 163c sends an infrared signal according to the situation of the input device 163, and more specifically, sends an infrared signal according to a light receiving state of the light receiving section 163a, the slope of the input device 163 and the moving direction and speed of the input device 163 detected by the acceleration sensor 163b, and the input from the direction key and the operation buttons. The infrared signal sent from the sending section 163c is received by the receiving section 161 as input data from the input device 163.

The interface section 117 outputs input data received by the receiving section 161 to the RAM 105, and the control section 103 interprets the input data and performs arithmetic processing. The interface section 117 also stores data indicating a progress status of the game stored in the RAM 105 into the memory card 162, based on a guidance from the control section 103, reads data of the game stored in the memory card 162 at the time when the game is stopped, and transmits the read data to the RAM 105.

The program and data for playing the game with the stationary video game apparatus 100 are initially stored in, for example, the recording medium 131. Examples of the data stored in the recording medium 131 include all graphic data for configuring objects existing in the game space (field formed in the game space, one's own and other player characters, and enemy characters).

The program and data stored in the recording medium 131 are read by the DVD/CD-ROM drive 113 during execution and are loaded on the RAM 105. The control section 103 processes the program and data loaded on the RAM 105 to output a rendering command to the graphic processing section 111 and output a sound output instruction to the sound processing section 109. Intermediate data during the processing of the control section 103 is stored in the RAM 105.

Figure 3:
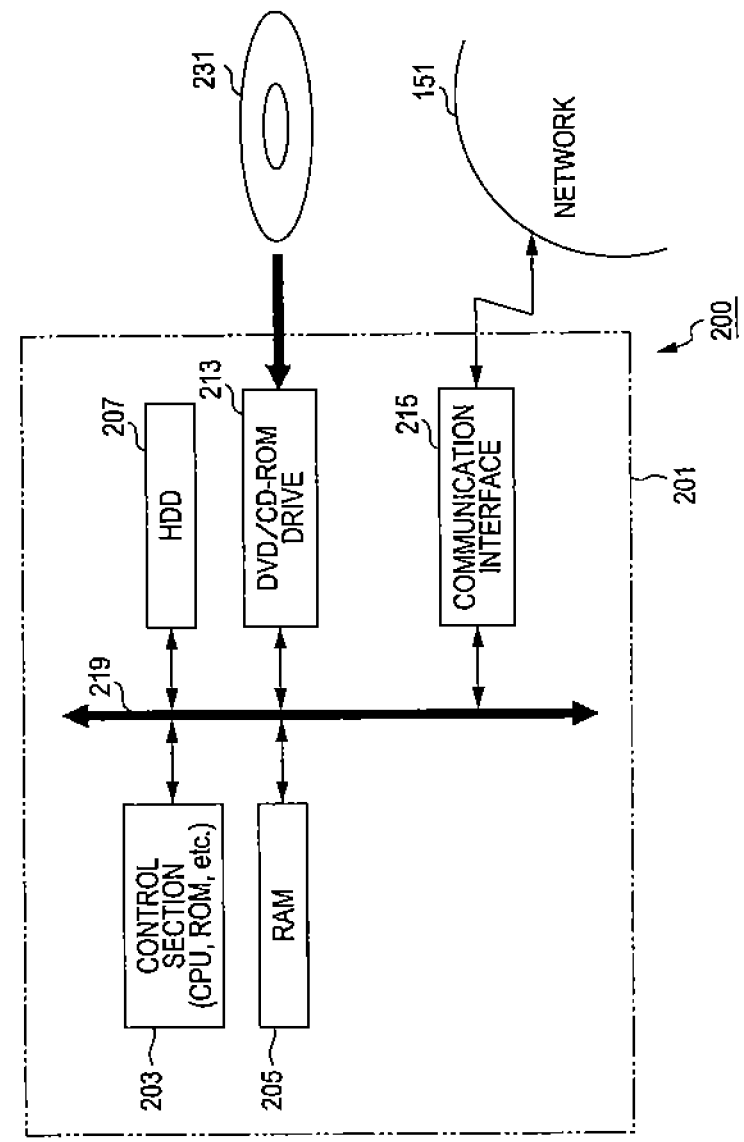
FIG. 3 is a block diagram illustrating a configuration of a server apparatus of FIG. 1.

FIG. 3 is a block diagram illustrating a configuration of the server apparatus 200 of FIG. 1. As illustrated, the server apparatus 200 is established centering on the apparatus body 201. The apparatus body 201 includes a control section 203, a RAM 205, a hard disk drive (HDD) 207, a DVD/CD-ROM drive 213, and a communication interface 215, which are connected to an internal bus 219. The DVD/CD-ROM drive 213 can be mounted with a recording medium (DVD-ROM or CD-ROM) 231.

The control section 203 includes a central processing unit (CPU), a read only memory (ROM), and the like, and executes a program stored in the HDD 207 or the recording medium 231 to perform a control of the server apparatus 200. The control section 203 includes an internal timer that counts a current time. The RAM 205 is a work area of the control section 203. The HDD 207 is a storage area for storing a program or data. The communication interface 215 is connected to the network 151 and performs a communication with the stationary video game apparatus 100 or the server apparatus 200.

The program and data for playing the communication game with the server apparatus 200 are initially stored in, for example, the recording medium 231 and are installed in the HDD 207 from this. The program and data are read from the HDD 207 during execution and are loaded on the RAM 205. The control section 203 processes the program and data loaded on the RAM 205 and progresses the communication game based on messages and the like which are sent from the respective stationary video game apparatuses 100. Intermediate data during the processing of the control section 203 is stored in the RAM 205.

Figure 4:
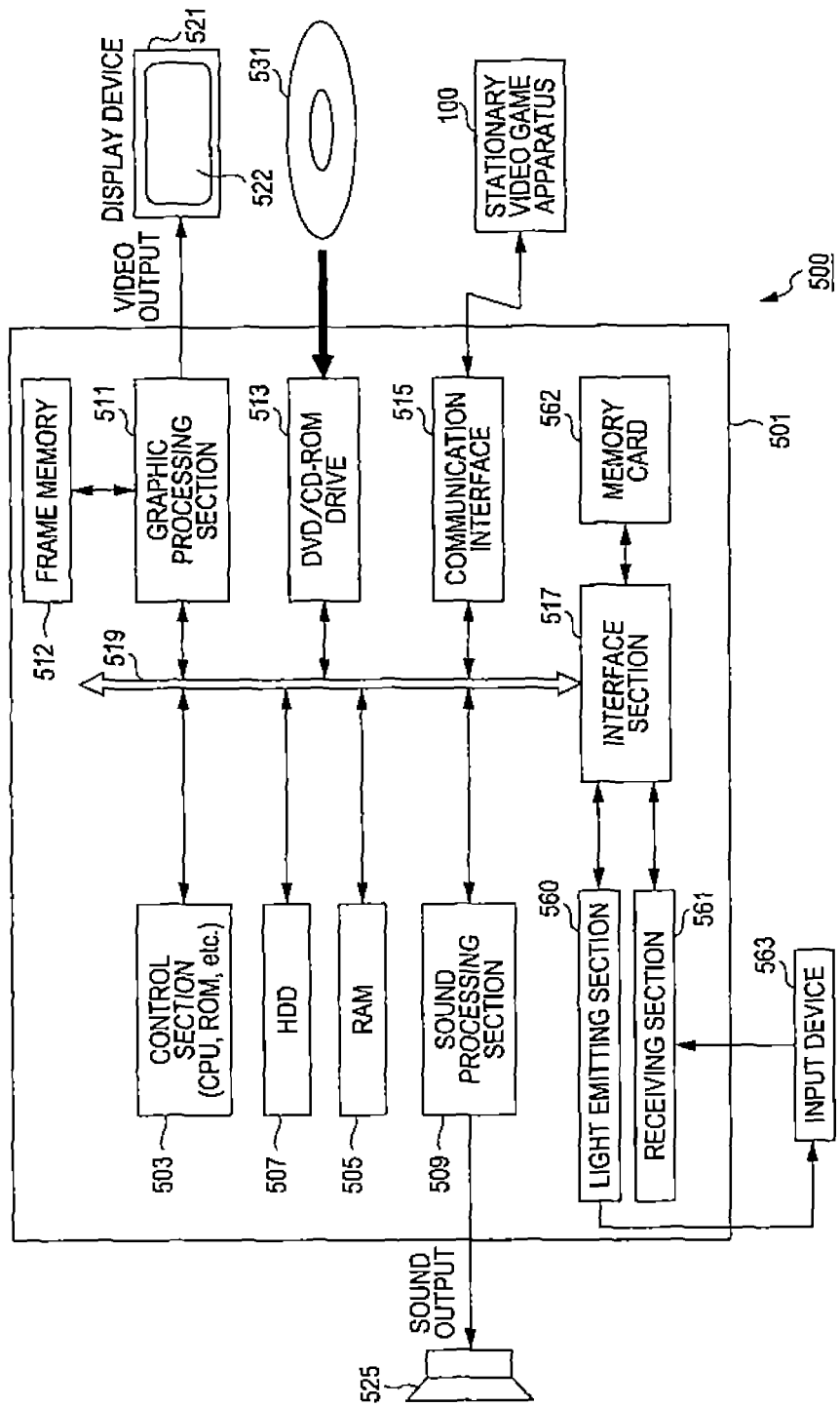
FIG. 4 is a block diagram illustrating a configuration of a portable video game apparatus of FIG. 1.

FIG. 4 is a block diagram illustrating a configuration of the portable video game apparatus 500 of FIG. 1. As illustrated, the portable video game apparatus 500 is established centering on an apparatus body 501. The apparatus body 501 includes a control section 503, a random access memory (RAM) 505, a hard disk drive (HDD) 507, a sound processing section 509, a graphic processing section 511, a DVD/CD-ROM drive 513, a communication interface 515, and an interface section 517, which are connected to an internal bus 519.

The sound processing section 509 of the apparatus body 501 is connected to a sound output device 525, which is a speaker, and the graphic processing section 511 is connected to a display device 521 having a display screen 522. The DVD/CD-ROM drive 513 can be mounted with a recording medium (in this embodiment, DVD-ROM or CD-ROM) 531. The communication interface 515 can be communication-connected to the stationary video game apparatuses 100 by wireless.

The control section 503 includes a central processing unit (CPU), a read only memory (ROM), and the like, and executes a program stored in the HDD 507 or the recording medium 531 to perform a control of the apparatus body 501. The control section 503 includes an internal timer that counts a current time. The RAM 505 is a work area of the control section 503. The HDD 507 is a storage area for storing a program or data. When the program executed by the control section 503 issues an instruction to perform a sound output, the sound processing section 509 interprets the instruction and outputs a sound signal to the sound output device 525.

According to a rendering command output from the control section 503, the graphic processing section 511 deploys an image on a frame memory (frame buffer) 512 (in the drawing, although illustrated in the outside of the graphic processing section 511, the frame memory 512 is provided inside a RAM included in a chip constituting the graphic processing section 511), and outputs a video signal for displaying an image on the display screen 522 of the display device 521. A 1-frame time of the image included in the video signal output from the graphic processing section 511 is, for example, 1/30 second.

The DVD/CD-ROM drive 513 reads the program and data from the recording medium 531. The communication interface 515 is connected to the network 151 and performs a communication with other computers.

An input device 563 includes a direction key and a plurality of operation buttons. In the operation of the player character manipulated by the player using the corresponding portable video game apparatus 500, an instruction is given by the manipulation of the operation buttons or the direction key included in the input device 563.

The interface section 517 outputs input data received by the receiving section 561 to the RAM 505, and the control section 503 interprets the input data and performs arithmetic processing. The interface section 517 also stores data indicating a progress status of the game stored in the RAM 505 into the memory card 562, based on a guidance from the control section 503, reads data of the game stored in the memory card 562 at the time when the game is stopped, and transmits the read data to the RAM 505.

The program and data for playing the game with the portable video game apparatus 500 are initially stored in, for example, the recording medium 531. Examples of the data stored in the recording medium 531 include all graphic data for configuring objects existing in the game space (field formed in the game space, one's own and other player characters, and enemy characters).

The program and data stored in the recording medium 531 are read by the DVD/CD-ROM drive 513 during execution and are loaded on the RAM 505. The control section 503 processes the program and data loaded on the RAM 505 to output a rendering command to the graphic processing section 511 and output a sound output instruction to the sound processing section 509. Intermediate data during the processing of the control section 503 is stored in the RAM 505.

Hereinafter, the game played in the communication game system will be described in more detail. In the communication game system of the invention, a plurality of players can access the server apparatus 200 from the stationary video game apparatuses 100 and log in to a community site. A plurality of "worlds" exist within the community site, and the world includes a plurality of "lobbies". The server apparatus 200 manages player IDs of players entering each lobby, and a player using the stationary video game apparatus 100 can check congestion states of the world and the lobby (a ratio of an upper limit enterable into one lobby to the number of persons who has actually entered) and the like on the display screen 122. The congestion state can be displayed according to a color of an icon indicating the lobby. For example, when the icon of the lobby is displayed with a blue color, it represents that the lobby is empty. When the icon of the lobby is displayed with a red color, it represents that the inside of the lobby is congested. While checking these congestion states, the player can select which world and lobby the player will enter by an input to the input device 163.

When the player enters a lobby, a lobby management table set in the server apparatus 200 stores a lobby ID specifying the lobby, and a player ID specifying the player entering the lobby in association with each other. When the player enters the lobby, the player can check the internal state of the lobby space on the display screen 122. Avatars corresponding to the respective players are set in advance, and the avatars set to the players entering the same lobby and the player names are displayed on the display screen 122. The server apparatus 200 notifies a player ID of a player newly entering the lobby to the stationary video game apparatuses 100 of the other players having already entered the lobby. A player name and an avatar of the player newly entering the lobby are displayed on the stationary video game apparatuses 100 of the other players receiving the notice. When the player is ejected from the lobby, the player ID of the ejected player is deleted from the lobby management table, and the avatar set to the ejected player is not displayed on the display screen 122.

The player entering the lobby can newly open a room within the lobby. The server apparatus 200 stores a new room name notified from the stationary video game apparatus 100, and notifies the new room name to the other stationary video game apparatuses 100. Also, a comment can be set to each room. For example, the purpose of the room can be set as the comment. For example, it is possible to display that the room is opened for players playing a game of a specific genre or a specific title, or that the room aims to achieve a specific quest of any game title. The comment is set by the player opening the room.

In order to start the game, the player having entered the room runs the game program in his/her own portable video game apparatus 500. When the player's own portable video game apparatus 500 and the stationary video game apparatus 100 establish a wireless communication connection, a connection request for requesting a connection with other portable video game apparatuses 500 is transmitted from the portable video game apparatus 500 through the server apparatus 200. Other stationary video game apparatuses 100, to which the connection request is transmitted, transmit the connection request to the portable video game apparatus 500 performing the wireless communication connection with the stationary video game apparatus 100. Since this series of connection processing is performed between the plurality of portable video game apparatuses 500 used by the players entering the same room, a virtual network is formed between the portable video game apparatuses 500.

By forming such a virtual network, a plurality of players can play at the same time within the virtual space formed when the game is played in the portable video game apparatus 500 of the player who is a host. In this case, the game program recorded in the recording medium 531 loaded on the portable video game apparatus 500 is executed.

In the invention, when the player who is the host calls for reinforcements, the call for reinforcements is notified to the stationary video game apparatus 100 or the portable video game apparatus 500 of the player who belongs to the same room and can be a guest. When the stationary video game apparatus 100 or the portable video game apparatus 500 of the player who can be a guest receives the notice of the call for reinforcements, other players receive the call for reinforcements and select whether to participate in the game which the host player plays.

As described above, the player characters of the players using the respective portable video game apparatuses 500 include the working characters and the AI characters. However, the working characters are fixed from the start to the end of the game as one body for each player. The AI character enables the player to select two random bodies among ten types of candidates. The AI character moves on a field while following the movement of the working character of the same player. A total three bodies of the working characters and the AI character form a party and progress the game for each player.

When the party of the player characters composed of the working characters and the AI character arrives at any one of a plurality of battle points set on the field, one or more bodies of enemy characters appear at the corresponding battle point, and a battle between the party of the player characters and the enemy characters is started. A leader may be set among the enemy characters fighting against the player character. Also, the enemy character may be a boss character which is one body of a very strong enemy character.

In the battle, hit points (HP: values representing the physical strengths of the player characters) of the respective characters (player characters and enemy characters) are decreased according to the attack from their opponents. The characters whose HP values become zero are inoperative in the battle (the enemy characters are ejected from the battle when their HP becomes zero). During the battle, in addition to merely attack against the enemy characters or defense against attacks from the enemy characters, the characters can open a treasure chest in a battle field to obtain items, or can steal items owned by the enemy characters.

When HPs of all enemy characters become zero and thus the enemy characters are completely destroyed, the party of the player characters wins. An experience point (value representing experience of the player character in the game, each character is reinforced by the increase of this value) is given to each player character participating in the battle. Also, an item is given to the player character according to the type of the destroyed enemy character.

In the game of the communication game system, basically, the players progress the game while operating their player characters, not forming a party with player characters of other players. However, a chatting function for performing information exchange between players is provided. For example, using the chatting function, the players can mutually provide information of dangerous sites on the field, or can teach other players locations where useful items are available during the progress of the game.

However, the chatting function of the communication game system does not merely aim at the information exchange between the players. If the player performs a predetermined input from the input device 163 or the input device 563 when a player character becomes inoperative in the battle, a support request message is sent to the stationary video game apparatuses 100 or the portable video game apparatuses 500 of other players through the server apparatus 200. The support request message, for example, is sent to the stationary video game apparatuses 100 of other players in the same room as the player making a support request. However, even for the players who are not in the same room as the host player, the support request message may be sent to the stationary video game apparatuses 100 of other players whose player characters are located relatively closely on the field. Also, other players who are guests can receive the support request message even when the players play the game, as well as when the players are on standby without playing the game in the portable video game apparatuses 500. When other players who are guests receive the support request while playing their own game and participate in the game of the host player, the game being played by the other players is stopped on the way.

Other players receiving the support request message can enter their working characters in the battle executed by the player character, instead of the inoperative player characters of the players sending the support request. The number of the working characters of other players which can participate in the battle is up to the number of the inoperative player characters. In addition, even though other players want to support the inoperative player characters with their own working characters, the players are forced to wait to participate in the battle until the working characters of other players previously participating in the battle are ejected from the corresponding battle as described later.

Also, instead of the support request, each player can previously set a guest participation mode that enables working characters of other players to participate in the battle. When the player instructs a setting to the guest participation mode from the input device 163 and gives a notice to the server apparatus 200, the server apparatus 200 performs a setting to the guest participation mode with respect to the battle executed by the party of the player characters of the corresponding players. When the party of the player characters set to the guest participation mode executes the battle, a display that can know that effect is also performed on the stationary video game apparatuses 100 of other players.

With respect to the battle of the party of player characters to which the guest participation mode is set, their own working characters are enabled to participate in the battle executed by the player characters of other players, instead of the AI character of the corresponding party. Herein, the number of the working characters of other players that can participate in the battle is up to the number (two bodies) of the AI characters of the corresponding party. Furthermore, even though other players want to support the inoperative player characters with their own working characters, the players are forced to wait to participate in the battle until the working characters of other players previously participating in the battle are ejected from the corresponding battle as described later.

Experience points or items are also given to the working characters participating in the battle executed by the party of the player characters of other players, if continuing to participate up to the time the corresponding battle ended in victory. Also, the working characters participating in the battle executed by the party of the player characters of other players are not limited in action itself and can obtain items by opening a treasure chest during the battle or steal items owned by the enemy characters.

Regardless of by the support request or by the setting to the guest participation mode, time limit allowing participation in the corresponding battle is imposed on the working characters participating in the battle executed by the party of the player characters of other players. That is, even when the working characters participate in the battle executed by the party of the player characters of other players, the corresponding working characters are ejected from the battle when the time elapsed from the start of participation reaches the time limit.

However, when the working characters participating in the battle executed by the party of the player characters of other players achieve a predetermined condition before the time limit, the time limit allowing the corresponding working characters to participate in the battle is extended. Examples of the condition for extending the time limit allowing the working characters to participate in the battle include defeating the enemy character (the number of enemy characters to defeat is added at each re-extension), obtaining items from the treasure chest, stealing items from the enemy characters, defeating the leader among the enemy characters, or the like.

For example, the initial time limit is set to 30 seconds, but the time limit is extended by 30 seconds if defeating at least one body of the enemy character until the initial time limit of 30 seconds has elapsed. Therefore, the working character can be allowed to continuously participate in the battle until 60 seconds from the start of participation in the battle. If defeating five or more bodies of the enemy characters until the extended time limit of 60 seconds has elapsed, the time limit is additionally extended by 30 seconds. Therefore, the working character can be allowed to continuously participate in the battle until 90 seconds from the start of participation in the battle. If obtaining items from a treasure chest until the extended time limit of 90 seconds has elapsed, the time limit is additionally extended by 30 seconds. Therefore, the working character can be allowed to continuously participate in the battle until 120 seconds from the start of participation in the battle.

Also, in the following description, the term "guest characters" refers to working characters participating in the battle executed by the party of the player characters of other players, and the term "waiting characters" refers to working characters which wait to participate in the battle executed by the part of the player characters of other players. The player characters of the party having originally executed the battle that the guest characters have participated in are referred to as host characters. Also, the term "host game apparatus" refers to the portable video game apparatus 500 used by the player who causes the party of his/her own player character to execute the battle with enemy characters, and the term "guest game apparatus" refers to the portable video game apparatus 500 used by the player of the guest character or the waiting character. Also, the term "host mediation apparatus" refers to the stationary video game apparatus 100 used by the player operating the host game apparatus to perform a communication connection with the host game apparatus by wireless so as to mediate the communication connection with the guest game apparatus. The term "guest mediation apparatus" refers to the stationary video game apparatus 100 used by the player operating the guest game apparatus to perform a communication connection with the guest game apparatus by wireless so as to mediate the communication connection with the host game apparatus.

Hereinafter, the game played in the communication game system will be described in more detail.

Hereinafter, a description will be given about data necessary for each player to cause his/her player character to execute the battle with the enemy character and necessary to cause the working characters of other players to participate in the corresponding battle in the communication game system according to the embodiment.

Figure 5A:
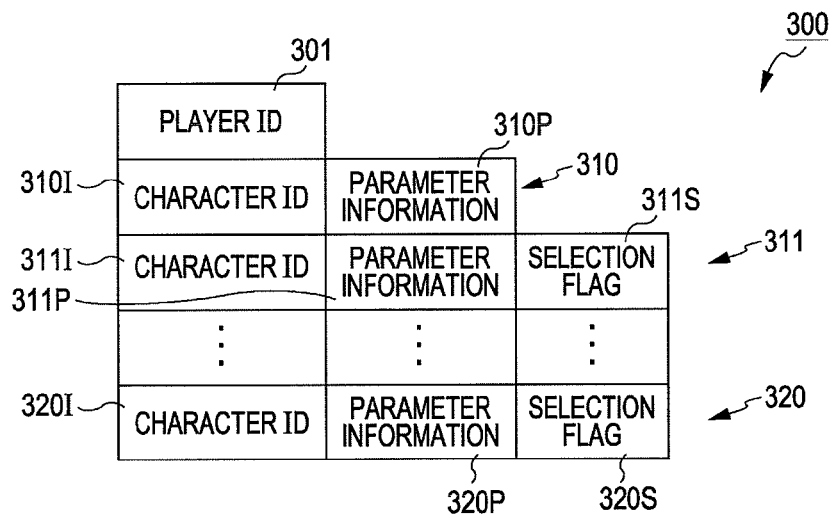
FIGS. 5A and 5B are diagrams illustrating various data managed in the server apparatus of FIGS. 1 and 3.
Figure 5B:
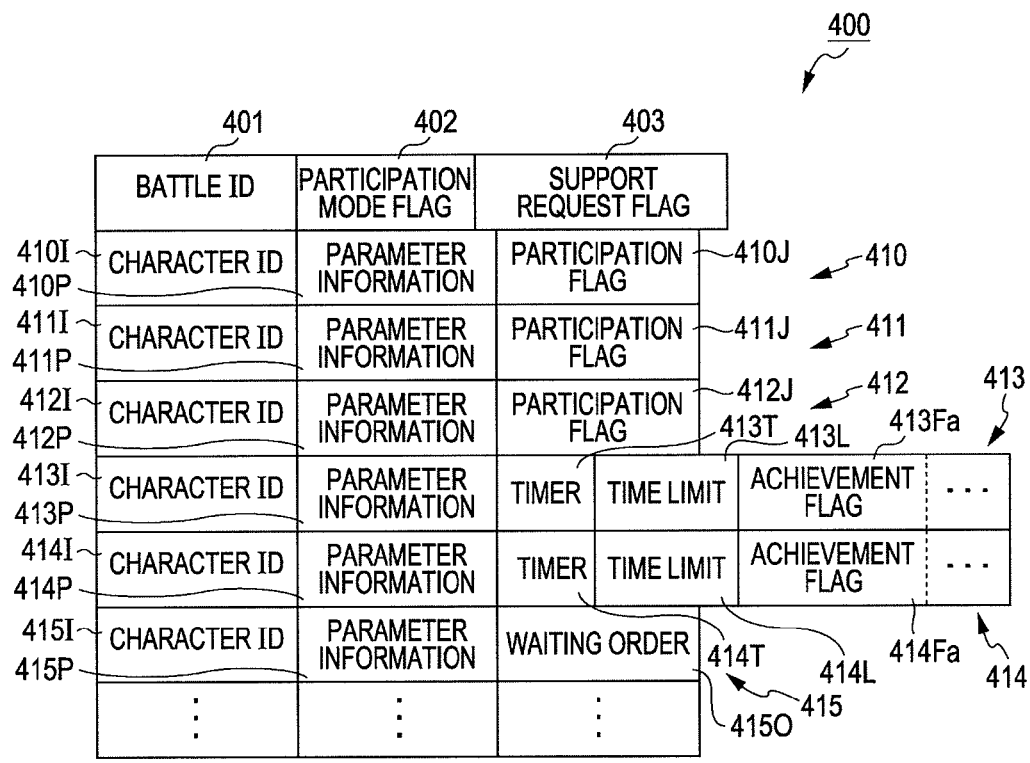

FIGS. 5A and 5B are diagrams illustrating various data managed in the host game apparatus. FIG. 5A illustrates a player-based character management table, and FIG. 5B illustrates a battle-based character management table.

The player-based character management table 300 of FIG. 5A includes a player ID 301 uniquely specifying each player. Also, in the player-based character management table 300, working character information 310 and AI character information 311 to 320 are registered.

Both the working character information 310 and the AI character information 311 to 320 include character IDs 310I to 320I uniquely specifying the respective player characters, and parameter information 310P to 320P representing parameters such as HPs or the like set to the respective player characters. The AI character information 311 to 320 further includes selection flags 311S to 320S, and the selection flags 311S to 320S for AI characters selected by the player among ten types of AI characters are set.

The battle-based character management table 400 of FIG. 5B is created at each battle whenever the battle between the party of a player character of any player and an enemy character is started, and is deleted when the corresponding battle is ended. The battle-based character management table 400 includes a battle ID 401 uniquely specifying the corresponding battle, a participation mode flag 402 representing whether the player corresponding to the party giving rise to the corresponding battle sets a guest participation mode, and a support request flag 403 representing whether any player character of the corresponding party becomes inoperative and makes a support request to other players.

Also, in the battle-based character management table 400, working character information 410, AI character information 411 and 412, guest character information 413 and 414, and waiting character information 415, and the like, may be registered. At the start point of the battle, only the working character information 410 and the AI character information 411 and 412 are registered in the battle-based character management table 400.

The working character information 410 and the AI character information 411 and 412 are generated by copying the AI character information 311 to 320, to which the working character information 310 and the selection flags 311S to 320S are set, from the player-based character management table 300 at the start point of the battle, and include the parameter information 410P to 412P. Also, character IDs 410I to 412I for uniquely specifying the player characters are included, and participation flags 410J to 412J representing being participating in the corresponding battle (not being inoperative and not being replaced with guest characters) are included.

The guest character information 413 and 414 includes character IDs 413I and 414I and parameter information 413P and 414P, and also includes participation time timers 413T and 414T representing time elapsed from the participation in the battle, time limits 413L and 414L allowing the participation in the battle, and achievement flags 413Fa . . . , 414Fa . . . of extension conditions of the participation time. When time represented in the participation time timers 413T and 414T reaches the time limits 413L and 414L, the achievement flags 413Fa . . . , 414Fa . . . are referred to, and the extension of the time limits 413L and 414L or the ejection of the corresponding guest characters from the battle is performed according to the result.

The waiting character information 415 . . . includes character IDs 415I . . . and parameter information 415P . . . , and also includes waiting order information 415O . . . assigned in order of intending to participate in the battle. When the working characters of other players intend to participate in the battle, information on the corresponding working characters is registered in the battle-based character management table 400 as the waiting character information 415 . . . . When satisfying the condition allowing the participation in the battle (there is the support request, or setting to the guest participation mode, not being compensated for the previously participated guest character, the waiting order is the first), the corresponding working characters are registered in the guest character information 413 and 414 as guest characters.

Hereinafter, the processing performed in the communication game system according to the embodiment will be described. Also, processing related to feature parts of the invention is processing in the battle, but a description about processing in the conventional battle, such as attacks of the player characters and the enemy characters against their opponents or the like, will not be made. Parts about features of the invention are illustrated and described with a flowchart.

Figure 6:
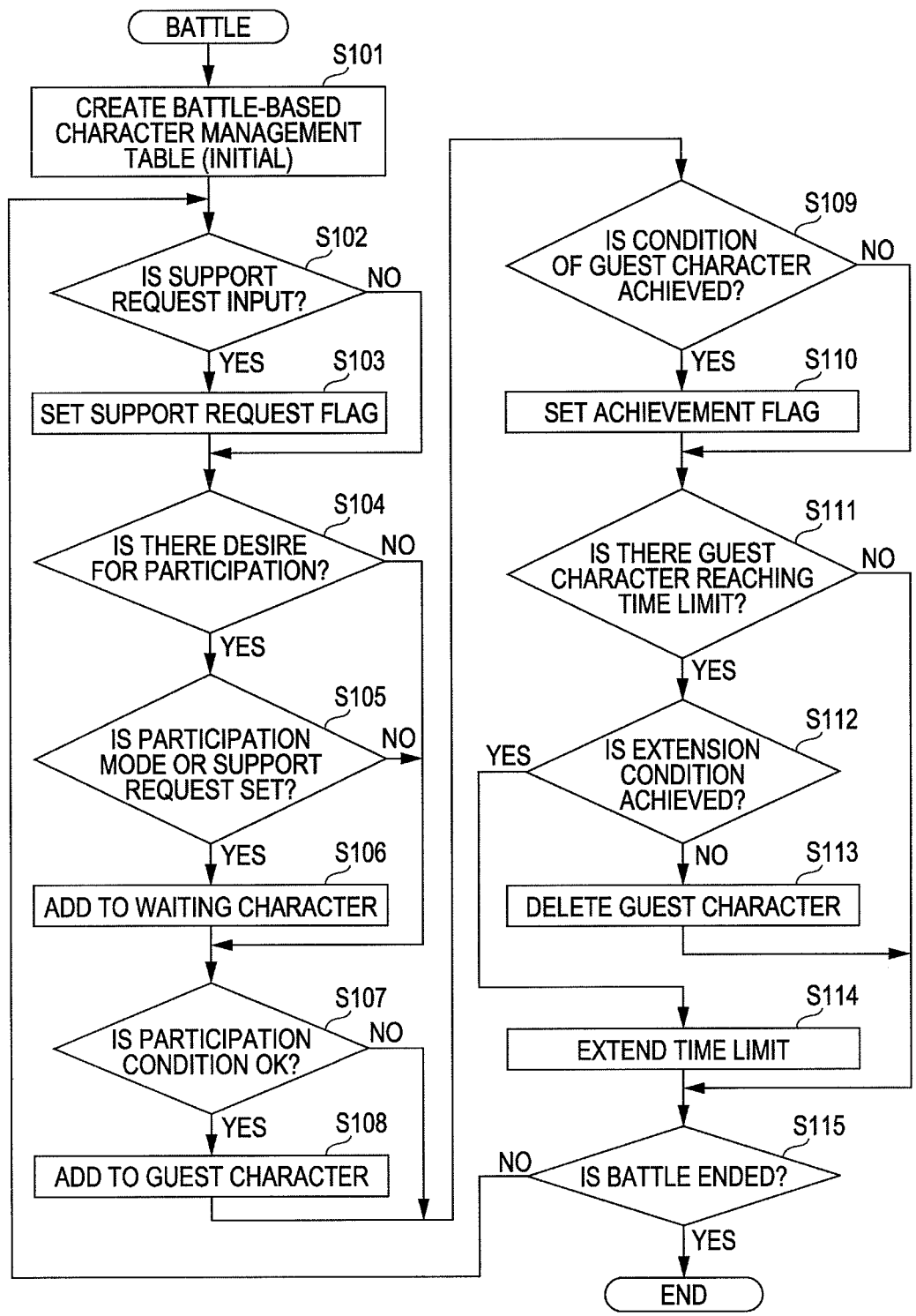
FIG. 6 is a flow chart illustrating processing performed by a server apparatus constituting a communication game system according to an embodiment of the invention.

FIG. 6 is a flowchart illustrating processing performed in the portable video game apparatus 500 of the host player (host game apparatus). When a party of a player character of any player arrives at a battle point on a field, a battle happens at the corresponding battle point, and the execution of the processing according to the invention is started. A player character included in the party having arrived at the battle point becomes a host character.

Also, information on an operation guidance input to the input device 563 of the guest game apparatus, or information on a status of HP or the like of the player character, and other predetermined game information are transmitted to the host game apparatus through the guest mediation apparatus, the host mediation apparatus, and the server apparatus 200. Also, the control section 503 of the host game apparatus executes the game program based on the received game information, the information on the operation guidance input to the input device 563 of the host game apparatus, or the like. As a result, character status information or position information, and other predetermined game information, which are acquired through operation by the processing of the game program, are transmitted to the guest game apparatus through the host mediation apparatus, the guest mediation apparatus, and the server apparatus 200, and are synchronized with the host game apparatus and the guest game apparatus.

In step S101, when the processing is started, the control section 503 of the portable video game apparatus 500 of the host player creates the battle-based character management table 400 for the corresponding battle. The creation of the initial-status battle-based character management table 400 is performed by copying the working character information 310, which is registered in the player-based character management table 300 of the corresponding player, and the AI character information 311 to 320 of the AI characters, to which the selection flags 311S to 320S are set, and registering the copied information as the working character information 410 and the AI character information 411 and 412, respectively. Also, when the corresponding player is set to the guest participation mode, the participation mode flag 402 is set.

Then, in step S102, the control section 503 determines whether a support request is input from the input device 163 or the input device 563. When the support request is not input, the control section 503 proceeds to processing of step S104. When the support request is input, the control section 503 sets the support request flag 403 of the battle-based character management table 400 in step S103 and proceeds to processing of step S104.

In step S104, the control section 503 determines from which guest game apparatus the guidance of causing the working character to participate in the battle is received. When the guidance of causing the working character to participate in the battle is not received from the guest game apparatus, the control section 503 proceeds to processing of step S107.

When the guidance of causing the working character to participate in the battle is received from the guest game apparatus, the control section 503 determines whether one of the participation mode flag 402 and the support request flag 403 is set in the battle-based character management table 400 in step S105. When neither participation mode flag 402 nor the support request flag 403 is set, the control section 503 proceeds to processing of step S107.

When one of the participation mode flag 402 and the support request flag 403 is set, the control section 503 reads the working character information 310 of the working character intending to participate from the player-based character management table 300 (that of a different player from that described in step S101), and registers the read working character information 310 in the battle-based character management table 400 as the waiting character information 415 . . . . Also, in step S106, a next order of the waiting characters registered so far (when there is no registered waiting character, the order is 1) is registered as the waiting order information 415O . . . . Then, the control section 503 proceeds to processing of step S107.

In step S107, the control section 503 determines whether the waiting character information 415 . . . satisfies the condition enough to allow the registered working characters of other players to participate in the battle (there is the support request, or setting to the guest participation mode, not being compensated for the previously participated guest character, the waiting order is the first). When not satisfying the condition enough to allow participation, the control section 503 proceeds to processing of step S109.

When satisfying the condition enough to allow participation, the control section 503 moves the waiting character information 415 . . . allowed to participate in the battle to the guest character information 413 and 414. Herein, when the guest character participates in the battle by substituting the guest character for the host character (regardless of the working character or the AI character), the participation flags 410J to 412J for the host character replaced with the guest character are reset. Also, in step S108, initial values of the time limits 413L and 414L are set, and the time count of the participation time timers 413T and 414T are started. Then, the control section 503 proceeds to processing of step S109.

In step S109, the control section 503 determines whether the extension condition of the time limits 413L and 414L is achieved in the action of the guest character participating in the battle. When not achieving the extension condition of the time limits 413L and 414L, the control section 503 proceeds to processing of step S111. In step S110, when achieving the extension condition of the time limits 413L and 414L, the control section 503 sets the achievement flags 413Fa . . . , 414Fa . . . for the corresponding guest character according to the achieved extension condition. Then, the control section 503 proceeds to processing of step S111.

In step S111, the control section 503 determines whether there are the guest characters for which the time elapsed from the start of participation in the battle, which is counted by the participation time timers 413T and 414T, reaches the time limits 413L and 414L. When there are no guest characters for which the time elapsed from the start of participation in the battle, which is counted by the participation time timers 413T and 414T, reaches the time limits 413L and 414L, the control section 503 proceeds to processing of step S115.

In step S112, when there are the guest characters for which the time elapsed from the start of participation in the battle, which is counted by the participation time timers 413T and 414T, reaches the time limits 413L and 414L, the control section 503 determines whether the achievement flags 413Fa . . . , 414Fa . . . satisfying the condition necessary to extend the time limits 413L and 414L are set with respect to the corresponding guest characters.

When the achievement flags 413Fa . . . , 414Fa . . . satisfying the condition necessary to extend the time limits 413L and 414L are not set, the control section 503 deletes the guest character information 413 and 414 on the corresponding guest characters from the battle-based character management table 400 in step S113, and proceeds to processing of step S115. When the achievement flags 413Fa . . . , 414Fa . . . satisfying the condition necessary to extend the time limits 413L and 414L are set, the control section 503 registers the extension of the time limits 413L and 414L for the corresponding guest characters in step S114, and proceeds to processing of step S115.

In step S115, the control section 503 determines whether the end condition of the corresponding battle is satisfied. When not satisfying the end condition of the corresponding battle, the control section 503 returns to step S102. When satisfying the end condition of the corresponding battle, processing of the flowchart is ended.

As described above, in the communication game system according to the embodiment, the respective players progress the game while moving the party of their own player characters on the field, not a group action with the player characters of other players. However, when the party of the player characters arrive at a battle point set on the field, the battle with the enemy characters are started at that place.

The party of the player characters is composed of a total three bodies of the working character operating according to the operation of the input device 563 and two bodies of the AI characters which move while following the working character and of which detailed operations are determined by the AI routines. However, while executing the battle, the HP of any player character among the three bodies may become zero, and thus, the player character may be inoperative.

When any one of the three bodies of the player characters becomes inoperative in the battle, a subsequent deployment of the battle becomes disadvantageous to the player. In this case, the support is requested to other players by using the chatting function provided in the communication game system according to the embodiment. Instead of the inoperative player character, the working character of other player participates in the battle and executes the battle. Therefore, the disadvantage due to the occurrence of the inoperative player character can be compensated.

Also, for other players, by such a support request being made, it becomes easy to make their own working characters to participate in the battle started to the party of player characters which are not their own ones. Since the players whose working characters participate in the battle of other players can obtain experience points or items when wining the corresponding battle, the players can enjoy the merit accordingly.

Also, in the communication game system according to the embodiment, the previously determined players do not progress the game always together, but the players execute the battle in cooperation with other players whenever the battle with the enemy characters is executed. Therefore, the cooperative play by more players can be easily realized.

Also, each player can previously set to the guest participation mode in advance. However, only in the case of setting to the guest participation mode, the guest character can be allowed to participate in the battle instead of the AI character, regardless of whether the AI character is inoperative. Therefore, since the opportunity to allow the guest character to participate in the battle happening in the party of other players increases, the cooperative play by more players can be more easily realized. On the other hand, even though not inoperative, only the AI character can be replaced with the guest character, and the working characters are not included. Therefore, there is no case in which the player giving rise to the battle in the party of his/her player character may not be involved in the corresponding battle.

Furthermore, the time limit allowing the guest character to participate in the battle is set, but the time limit is extended whenever the corresponding guest character achieves the predetermined condition in the battle. That is, the guest character which is active in the battle can continuously participate in the battle for a long time, but the guest character which is not active is quickly ejected from the battle. Therefore, each player can progress the battle with high priority by the participation of the guest character.

The invention is not limited to the above-described embodiment, and various modifications and applications can be made. Hereinafter, modifications of the above-described embodiment applicable to the invention will be described.

In the above-described embodiment, three bodies of characters forming the party for each player include one fixed body of the working character and two bodies of AI characters selected by the player among ten types of characters. In this regard, instead of fixing the working character from the start to the end of the game, the player may designate one body as the working character and two bodies as the AI characters among a plurality of types of characters selectable as the player characters.

Also, the plurality of player characters forming the party do not include the AI characters autonomously operated by the AI routine, and may operate according to the guidance input from the input device 563 by all players. In this case, the types of the player characters operating according to the guidance from the input device 563 may be replaced by the operation of the player, or the player characters operating according to the guidance from the input device 563 may be automatically replaced in predetermined order.

In the above-described embodiment, when the time counted by the participation time timers 413T and 414T reaches the time limits 413L and 414L, the predetermined condition is achieved. Therefore, the time allowing the guest character to participate in the battle is extended and the length of the time is variable. However, the method of varying the time allowing the guest character to participate in the battle is not limited thereto. For example, this may be realized by pausing the time counting of the participation time timers 413T and 414T by a predetermined time whenever the guest character achieves a predetermined task.

In the above-described embodiment, only when the player of the party starting the battle makes a support request, or the setting to the guest participation mode is previously done, the guest character is allowed to participate in the battle. Even though there is no support request or the setting to the guest participation mode, the guest character may be allowed to participate in the battle (however, the working character which is not inoperative may not be replaced). Also, even when the setting to the guest participation mode is previously done, the player may be allowed to make the support request.

In the above-described embodiment, in the battle between the party of the player characters of the respective players and the enemy characters, the guest character is allowed to participate under the predetermined condition. However, the game permitting the participation of the guest character by the method of the invention is not limited to the battle with enemy characters, but may also be applied to other game events, for example, the search of items scattered on the field.

In the above-described embodiment, the support request message from the portable video game apparatus 500 of the player executing the battle may be sent to the selected portable video game apparatuses 500 of other players, which locate the player characters relatively closely on the field. However, if just being located closely on the field, the working characters of other players may never be helpful in the corresponding battle. Therefore, the working characters of other players suitable for the support may be extracted by predetermined matching processing, and the support request message may be sent to only the stationary video game apparatuses 100 or the portable video game apparatuses 500 corresponding to the extracted working characters.

In the above-described embodiment, the communication game system, which includes the server apparatus 200, the plurality of stationary video game apparatuses 100 connected to the server apparatus 200 through the network 151, and the portable video game apparatuses 500 communication-connected to the stationary video game apparatuses 100 by wireless, has been described as an example of the communication game system of the invention. However, the communication game system capable of executing the invention is not limited to such a system configuration. Instead of the stationary video game apparatuses 100, a portable game apparatus, a portable phone, a PDA, a general-purpose personal computer, or the like may be used, and a system in which these are mixed may be used.

Also, the invention can be realized by a communication game system including a stationary game apparatus and a plurality of portable game apparatuses which perform a communication with the stationary game apparatus by infrared ray, Bluetooth, or the like. In the communication game system having such a system configuration, the stationary game apparatus may manage the function of the server apparatus 200 in the above-described embodiment.

In the system including the stationary game apparatus and the plurality of portable game apparatuses, the player (host player) of one portable game apparatus may access the stationary game apparatus to create a room therein and register a participation request of the player (guest player) of other game apparatus therein, and the host player can progress a game (including the same battle as that of the above-described embodiment) through his/her own portable game apparatus. The guest player can access the stationary game apparatus from his/her own portable game apparatus, select and enter the room created by the host player, and participate in the game (battle) executed by the host player on the way.

When wanting the guest player to participate in the game (battle) executed by the host player, first, the support request is notified to the portable game apparatus of the guest player, and the participation in the game (battle) can be enabled when the request is accepted. Alternatively, when the host player is playing the game (battle) in a support OK status, the participation in the game (battle) of the guest player can be enabled.

Furthermore, the game of the invention can also be realized by a communication game system which does not include an apparatus corresponding to the server apparatus 200 and connects a plurality of stationary video game apparatuses 100 peer-to-peer, or a communication game system which connects a plurality of portable game apparatuses through an ad-hoc communication. In this case, the stationary video game apparatus 100 or the portable game apparatus of the player starting the battle in the party of his/her own player character can manage the function of the server apparatus 200 in the above-described embodiment.

In the above-described embodiment, the program and data of the server apparatus 200 are stored in the recording medium 231 and distributed. In this regard, the program and data may be stored in a fixed disk device included in other server apparatus existing on the network and be transferred to the apparatus body 201 through the network. In the server apparatus 200, the program and data which the communication interface 215 receives from the server apparatus may be stored in the HDD 207 and loaded on the RAM 205 upon execution.

In the above-described embodiment, the host game apparatus and the guest game apparatus are configured such that predetermined data is transmitted and received through the host mediation apparatus, the guest game apparatus, and the server apparatus, and the game program is executed in the host game apparatus. However, by concentrating all data for progressing the game on the server apparatus 200, the game may be progressed by the control of the server apparatus 200. In this case, in the RAM 205 or the HDD 207 of the server apparatus 200, game data such as the player-based character management table and the battle-based character management table of FIGS. 5A and 5B, or the like are managed.

The respective players input the guidance of the operation for their own working characters from the input devices 563 of their own portable video game apparatuses 500. The processing of the player characters based on the guidance input from the input device 563 is not performed in the portable video game apparatus 500 and is concentrated on the server apparatus 200 through the stationary video game apparatus 100. The server apparatus 200 processes the operations of the player characters of the respective players (working characters and AI characters), and returns the processing result to the respective portable video game apparatuses 500. Also, in this case, in steps S101 to S115 illustrated in FIG. 6, a series of processing from the creation of the battle-based character management table to the end of the battle is performed in the control section 203 of the server apparatus 200.

Also, the above-described embodiment is configured such that the host player and the guest player operate the portable video game apparatuses 500, the host player and the guest player use the stationary video game apparatuses 100 connected to the communication network, respectively, and the network game is executed by performing the communication connection through the stationary video game apparatuses 100 and the server apparatus 200. However, the invention can also be applied to a case in which the video game apparatuses operated by the host player and the guest player are communication-connected to the server apparatus 200 by the communication network, without passing through the apparatus for mediation. In this case, in the RAM 205 or the HDD 207 of the server apparatus 200, game data such as the player-based character management table and the battle-based character management table of FIGS. 5A and 5B, or the like are managed. A series of processing in steps S101 to S115 illustrated in FIG. 6 is performed in the control section 203 of the server apparatus 200.

What is claimed is:

1. A communication game system comprising:
   a host terminal apparatus used by a host player; and
   at least one guest terminal apparatus used by at least one guest player,
   wherein the host terminal apparatus and the at least one guest terminal apparatus are communication-connected to allow the at least one guest player to participate in a game executed by the host player,
   the game is progressed by operating a plurality of host characters by the host player, the plurality of host characters including at least one character operating according to a guidance from the host player, by operation of the host player,
   the host terminal apparatus includes a host guidance imputer that inputs the guidance of the host player for progressing the game,
   each of the at least one guest terminal apparatus includes:
      a guest guidance inputer that inputs a guidance from a guest player for progressing the game by operating a guest character according to the guidance from the guest player, by the operation of the guest player; and
      a game participater that allows the guest character to temporarily participate in the game executed by the host player,
   the communication game system includes a game progresser that progresses the game by operating the plurality of host characters according to the guidance from the host guidance inputer, causes the guest character to temporarily participate by substituting the guest character for any host character of the plurality of host characters when the host character is inoperative, and progresses the game by operating the guest character according to the guidance from the guest guidance inputter, and
   the game progresser causes the guest character to temporarily participate in the game for a predetermined period of time, the predetermined period of time being extended by a predetermined amount of time when the guest character achieves a predetermined condition.

2. The communication game system according to claim 1, wherein
   the host terminal apparatus further includes a support requestor that requests a support by the guest character in the game, with respect to at least one of the at least one guest terminal apparatus, when the host character is inoperative while the game is progressed, and
   when receiving the support request by the support requestor, the game participater causes the guest character to participate in the game by substituting the guest character for the host character that is inoperative.

3. The communication game system according to claim 1, wherein the plurality of host characters include an autonomous working character operating regardless of the guidance from the host guidance inputter,
   the host terminal apparatus further includes a participation mode setuper that sets a guest participation mode which allows the guest player to participate by substituting the guest player for the autonomous working character in the game, and
   when the guest participation mode is set in the host terminal apparatus, the game participater causes the guest character to participate in the game by substituting the guest character for the autonomous working character.

4. The communication game system according to claim 1, wherein a participation time of the guest character in the game is variable according to an operation result of the guest character in the game after participation in the game.

5. The communication game system according to claim 4, wherein a task, which is necessary for the guest character participating in the game to achieve, is set as the predetermined condition in the game, and
   the participation time of the guest character is extended whenever the task is achieved.

6. The communication game system according to claim 1, wherein the game progresser further causes a next guest character to temporarily participate in the game by substituting the next guest character for the guest character when the guest character is inoperative.

7. A communication game system, comprising:
   a host mediation apparatus used by a host player;
   a host terminal apparatus that is communication-connectable to the host mediation apparatus and executes a game by operation of the host player;
   a guest mediation apparatus used by a guest player; and
   a guest terminal apparatus that is communication-connectable to the guest mediation apparatus and executes the game by operation of the guest player,
   wherein the host terminal apparatus and the guest terminal apparatus are communication- connected through the host mediation apparatus and the guest mediation apparatus to allow the guest player to participate in the game executed by the operation of the host player, the game is progressed by operating a plurality of host characters by the host player, the plurality of host characters including at least one character operating according to a guidance from the host player, by the operation of the host player,
   the host terminal apparatus includes a host guidance inputter that inputs the guidance of the host player for progressing the game,
   the guest terminal apparatus includes:
      a guest guidance inputter that inputs a guidance of the guest player for progressing the game by operating a guest character according to the guidance from the guest player, by operation of the guest player using the guest terminal apparatus; and
      a game participater that allows the guest character to temporarily participate in the game executed by the operation of the host player, the communication game system includes a game progresser that progresses the game by operating the plurality of host characters according to the guidance from the host guidance inputter, causes the guest character to temporarily participate by substituting the guest character for any host character of the plurality of host characters when the host character is inoperative, and progresses the game by operating the guest character according to the guidance from the guest guidance inputter, and the game progresser causes the guest character to temporarily participate in the game for a predetermined period of time, the predetermined period of time being extended by a predetermined amount of time when the guest character achieves a predetermined condition.

8. The communication game system according to claim 7, wherein the game is a battle with the plurality of host characters and enemy characters, and the game participater causes the guest character to temporarily participate in the battle.

9. The communication game system according to claim 8, wherein, when the guest character is located relatively close to the plurality of host characters on a field formed in a virtual space of the game, the game participater causes the guest character to temporarily participate in the battle.

10. The communication game system according to claim 7, wherein the host terminal apparatus further includes:

a support requestor that requests a support by the guest character in the game, with respect to the guest terminal apparatus, when the host character is inoperative while the game is progressed, and when receiving the support request by the support requestor, the game participater causes the guest character to temporarily participate in the game by substituting the guest character for the host character that is inoperative.

11. The communication game system according to claim 10, wherein the guest terminal apparatus receives the support request when the guest payer is on standby without playing the game.

12. The communication game system according to claim 10, wherein the guest terminal apparatus receives the support request when the guest payer plays a different game.

13. The communication game system according to claim 12, wherein the guest terminal apparatus further includes:

a game stopper that stops the game, the game having been played by the guest player, when the guest terminal apparatus receives the support request and causes the guest character to temporarily participate in the game executed by the operation of the host player.

14. The communication game system according to claim 10, wherein the guest terminal apparatus further includes:

a participation selection receiver that receives a selection of the guest player of whether the guest player temporarily participates in the game when the guest terminal receives the support request by the support requestor.

15. The communication game system according to claim 10, wherein a number of guest characters which are able to temporarily participate in the game is at most equal to a number of operative host characters.

16. The communication game system according to claim 7, wherein the host terminal apparatus further comprises:

a guest character ejector that ejects the guest character from the game when an elapsed time from a participation of the guest character in the game reaches the predetermined period of time, wherein the game participator causes a waiting character to temporarily participate in the game as the guest character, waiting orders assigned to waiting characters in an order of intending to temporarily participate in the game.

17. A communication game apparatus for allowing any one of at least one guest player to participate in a game executed by a host player by a communication connection with at least one guest terminal apparatus used by the at least one guest player, wherein the game is progressed by operating a plurality of host characters by the host player, the plurality of host characters including at least one character operating according to a guidance from the host player, by operation of the host player, the communication game apparatus comprises:

a game progresser that progresses the game by operating the plurality of host characters according to the guidance from the host player; and a game participater that receives a temporary participation of a guest character operating according to a guidance from a guest player in the game executed by the game progresser, when the guest character is allowed to temporarily participate in the game by the game participater, the game progresser receives the temporary participation of the guest character by substituting the guest character for any host character of the plurality of host characters when the host character is inoperative, and progresses the game by operating the guest character according to the guidance from the guest player, and the game progresser causes the guest character to temporarily participate in the game for a predetermined period of time, the predetermined period of time being extended by a predetermined amount of time when the guest character achieves a predetermined condition.

18. A communication game apparatus for allowing a guest player to participate in a game executed by a host player by communication-connecting to a guest terminal apparatus executing the game by operation of the guest player, the guest terminal apparatus being communication-connectable to a guest mediation apparatus through a communication connection between the guest mediation apparatus used by the guest player and a host mediation apparatus used by a host player, wherein the game is progressed by operating a plurality of host characters by the host player, the plurality of host characters including at least one character operating according to a guidance from the host player, by operation of the host player, the communication game apparatus comprises:

a game progresser that progresses the game by operating the plurality of host characters according to the guidance from the host player; and a game participater that receives a temporary participation of a guest character operating according to a guidance from the guest player in the game progressed by the game progresser, when the guest character is allowed to temporarily participate in the game by the game participater, the game progresser receives the temporary participation of the guest character by substituting the guest character for any host character of the plurality of host characters when the host character is inoperative, and progresses the game by operating the guest character according to guidance from the guest player, and the game progresser causes the guest character to temporarily participate in the game for a predetermined period of time, the predetermined period of time being extended by a predetermined amount of time when the guest character achieves a predetermined condition.

19. A non-transitory computer-readable medium including a program for executing a communication game allowing any one of at least one guest player to participate in a game executed by a host player by a communication connection with at least one guest terminal apparatus used by at least one guest player,
- wherein the game is progressed by operating a plurality of host characters by the host player, the plurality of host characters including at least one character operating according to a guidance from the host player, by operation of the host player,
- the program causes a computer apparatus to function as:
  - a game progresser that progresses the game by operating the plurality of host characters according to the guidance from the host player, and
  - a game participater that receives a temporary participation of a guest character operating according to a guidance from a guest player in the game executed by the game progresser,
- when the guest character is allowed to temporarily participate in the game by the game participater, the game progresser receives the temporary participation of the guest character by substituting the guest character for any host character of the plurality of host characters when the host character is inoperative, and progresses the game by operating the guest character according to the guidance from the guest player, and
- the game progresser causes the guest character to temporarily participate in the game for a predetermined period of time, the predetermined period of time being extended by a predetermined amount of time when the guest character achieves a predetermined condition.

20. A non-transitory computer-readable medium including a program for executing a communication game allowing a guest player to participate in a game executed by a host player by communication-connecting to a guest terminal apparatus executing the game by operation of the guest player, the guest terminal apparatus being communication- connectable to a guest mediation apparatus through a communication connection between the guest mediation apparatus used by the guest player and a host mediation apparatus used by a host player,
- wherein the game is progressed by operating a plurality of host characters by the host player, the plurality of host characters including at least one character operating according to a guidance from the host player, by operation of the host player,
- the program causes a computer apparatus to function as:
  - a game progresser that progresses the game by operating the plurality of host characters according to the guidance from the host player, and
  - a game participater that receives a temporary participation of a guest character operating according to a guidance from the guest player in the game progressed by the game progresser,
- when the guest character is allowed to temporarily participate in the game by the game participater, the game progresser receives the temporary participation of the guest character by substituting the guest character for any host character of the plurality of host characters when the host character is inoperative, and progresses the game by operating the guest character according to the guidance from the guest player, and
- the game progresser causes the guest character to temporarily participate in the game for a predetermined period of time, the predetermined period of time being extended by a predetermined amount of time when the guest character achieves a predetermined condition.

* * * * *

UNITED STATES PATENT AND TRADEMARK OFFICE
CERTIFICATE OF CORRECTION

| | | |
|---|---|---|
| PATENT NO. | : 8,998,724 B2 | Page 1 of 1 |
| APPLICATION NO. | : 13/548636 | |
| DATED | : April 7, 2015 | |
| INVENTOR(S) | : H. Tabata | |

It is certified that error appears in the above-identified patent and that said Letters Patent is hereby corrected as shown below:

In the Claims

Column 21, line 41 please change "imputer that" to --inputter that--
Column 21, line 44 please change "inputer that" to --inputter that--
Column 21, line 54 please change "inputer, causes" to --inputter, causes--
Column 22, line 48 please change "communication- connected" to --communication-connected--
Column 26, line 4 please change "communication- connectable" to --communication-connectable--

Signed and Sealed this
First Day of September, 2015

Michelle K. Lee
*Director of the United States Patent and Trademark Office*